(12) United States Patent
Howarth et al.

(10) Patent No.: US 10,866,382 B2
(45) Date of Patent: Dec. 15, 2020

(54) PWM SCREENING IN A CAMERA

(71) Applicant: Cambridge Mechatronics Limited, Cambridge (GB)

(72) Inventors: James Howarth, Cambridge (GB); Andrew Benjamin David Brown, Cambridge (GB); Igor Gotlibovych, Cambridge (GB); Robin Eddington, Cambridge (GB); Ian Edward Charles Rogers, Cambridge (GB); Nicholas Henry Reddall, Cambridge (GB)

(73) Assignee: Cambridge Mechatronics Limited, Cambridgeshire (GB)

( * ) Notice: Subject to any disclaimer, the term of this patent is extended or adjusted under 35 U.S.C. 154(b) by 0 days.

(21) Appl. No.: 16/318,503

(22) PCT Filed: Jul. 20, 2017

(86) PCT No.: PCT/GB2017/052140
§ 371 (c)(1),
(2) Date: Jan. 17, 2019

(87) PCT Pub. No.: WO2018/015762
PCT Pub. Date: Jan. 25, 2018

(65) Prior Publication Data
US 2019/0250366 A1 Aug. 15, 2019

(30) Foreign Application Priority Data

Jul. 22, 2016 (GB) .................................. 1612710.2
Oct. 26, 2016 (GB) .................................. 1618098.6
(Continued)

(51) Int. Cl.
*G02B 7/08* (2006.01)
*G03B 3/10* (2006.01)
(Continued)

(52) U.S. Cl.
CPC ............... *G02B 7/08* (2013.01); *F03G 7/065* (2013.01); *G02B 7/02* (2013.01); *G03B 3/10* (2013.01);
(Continued)

(58) Field of Classification Search
CPC .......... G02B 7/08; G02B 7/02; G02B 27/646; G03B 13/18; G03B 3/10; H04N 5/2253; H04N 5/225; F03G 7/065
See application file for complete search history.

(56) References Cited

U.S. PATENT DOCUMENTS

2007/0109412 A1    5/2007  Hara
2015/0304561 A1*  10/2015  Howarth ............ H04N 5/23258
                                                                    348/374

(Continued)

FOREIGN PATENT DOCUMENTS

JP       2007333792       12/2007

OTHER PUBLICATIONS

International Search Report and Written Opinion for International Application No. PCT/GB2017/052140, dated Sep. 20, 2017.

*Primary Examiner* — Gevell V Selby

(74) *Attorney, Agent, or Firm* — Hartman Global IP Law; Gary M. Hartman; Domenica N.S. Hartman

(57) ABSTRACT

A miniature camera having an image sensor; an actuator which includes conductive components capable of conducting a pulse width modulation drive signal for driving the actuator; and a screening component located between the conductive components of the actuator and the image sensor, the screening component being electrically isolated from the actuator.

20 Claims, 4 Drawing Sheets

(30) Foreign Application Priority Data

Dec. 1, 2016 (GB) .................................. 1620412.5
Jul. 3, 2017 (GB) .................................. 1710599.0

(51) Int. Cl.
*G03B 13/18* (2006.01)
*G02B 7/02* (2006.01)
*F03G 7/06* (2006.01)
*H04N 5/225* (2006.01)

(52) U.S. Cl.
CPC ........... *G03B 13/18* (2013.01); *H04N 5/2253* (2013.01); *H04N 5/225* (2013.01)

(56) References Cited

U.S. PATENT DOCUMENTS

| 2016/0178923 A1* | 6/2016 | Hayashi | ............... | H04N 5/2328 359/557 |
| 2016/0187668 A1* | 6/2016 | Hayashi | ............... | H04N 5/2254 359/507 |

* cited by examiner

PWM SCREENING IN A CAMERA

CROSS-REFERENCE TO RELATED APPLICATIONS

This application claims priority to International Patent Application No. PCT/GB2017/052140 filed Jul. 20, 2017, which claims the benefit of GB 1612710.2 filed Jul. 22, 2016, GB 1618098.6 filed Oct. 26, 2016, GB 1620412.5 filed Dec. 1, 2016, and GB 1710599.0 filed Jul. 3, 2017. The contents of these prior applications are incorporated herein by reference.

BACKGROUND OF THE INVENTION

The present invention relates to a camera including an actuator driven by a pulse width modulation (PWM) drive signal.

Cameras provided in consumer electronic devices such as smartphones, tablet computers etc. often incorporate an electro-mechanical actuator. Such an actuator may drive movement of a lens relative to an image sensor, for example to adjust a focus position of the lens, often as part of an autofocus (AF) system, and/or to perform optical image stabilization (OIS). To achieve accurate positioning of the movable lens such actuators are typically driven with a linear current feed. However, the use of such drives is inefficient and power consumption can be reduced if PWM drives are used. However, it is known that the use of a PWM drive circuit for driving an electro-mechanical actuator interferes with the image sensor of the camera, typically causing artefacts to appear in the resulting digital image such as a faint but noticeable horizontal lines or speckle.

This is a particular problem for an actuator that comprises shape memory alloy (SMA) material, for example SMA wire. There are particular advantages in the use of SMA as an actuator in a camera, for example to drive movement of the lens relative to the image sensor. Compared to other actuation technologies SMA provides a high actuation force in a compact physical configuration, that may for example provide focussing of the image formed on the image sensor and/or OIS. In the case of an SMA actuator, it is desirable to use a PWM drive signal.

Various methods have been used to reduce or eliminate this noise, whilst maintaining use of the actuators driven by a PWM drive signal. U.S. Pat. No. 9,654,689 discloses one such example where two electrical drive circuits are attached to a voice coil motor (VCM) electro-mechanical actuator, a PWM drive circuit and a linear drive circuit. The linear circuit is used during the readout phase of operation of the image sensor, and the PWM drive circuit is used during the integration phase of operation of the image sensor. This approach is undesirable because it increases the cost and complexity of the electro-mechanical actuator drive circuit, as well as reducing the power efficiency of the device in use.

It is desirable therefore to produce a design that limits the image noise picked up by the image sensor but without adding additional cost and complexity to the electronic drive circuit for the actuators.

BRIEF SUMMARY OF THE INVENTION

According to the present invention, there is provided a camera comprising: an image sensor; an actuator which includes conductive components capable of conducting a pulse width modulation drive signal for driving the actuator; and a screening component located between (a) the conductive components of the actuator and (b) the image sensor, the screening component being electrically isolated from the actuator.

As the screening component is located between (a) the conductive components of the actuator and (b) the image sensor, the screening component reduces interference from the PWM drive signal with the image sensor, thereby reducing the appearance of artefacts in the displayed image.

The invention may be applied to an actuator that comprises SMA material, for example SMA wire.

The camera may comprise a lens arranged to form an image on the image sensor, in which case the actuator may be arranged to drive movement of the lens relative to the image sensor, for example to provide focussing of the image formed on the image sensor and/or OIS.

The screening component may be not connected to an electrical earth. Thus, the screening component electrically floats. This provides as good a screen for the image sensor as if it were earthed, and may even assist in the reduction of interference. This is surprising because electro-magnetic screening in other applications is often connected to an electrical earth, as for example a Faraday cage. The absence of connection to an electrical earth is advantageous, because adequate earthing for high frequency noise is difficult whilst achieving a compact design.

The screening component may comprise magnetically permeable material, for example having a high relative magnetic permeability. The magnetically permeable material may have a relative magnetic permeability greater than 2, preferably greater than 100, most preferably greater than 500.

The screening component may comprise electrically conductive material, for example having a high electrical conductivity. The electrically conductive material may have an electrical conductivity higher than 2 MS/m, preferably higher than 10 MS/m, even more preferably higher than 50 MS/m.

The shielding component may comprise plural metal layers having different electro-magnetic properties, for example including a first layer comprising magnetically permeable material and a second layer comprising electrically conductive material. There may be at least one layer of insulating material between the metal layers, for example an adhesive used to adhere the layers together. Alternatively, the layers may adhere in any other way, for example one or more the layers being a coating on another layer.

In an advantageous embodiment, a first layer comprising magnetically permeable material has a second layer comprising electrically conductive material on one side of the first layer, and optionally and a third layers comprising electrically conductive material on the other side of the first layer, which may be electrically connected to the second layer.

In another advantageous embodiment, a first layer comprising magnetically permeable material is encapsulated by electrically conductive material, which may be applied as a coating, so that as to form second and third layers comprising electrically conductive material on either side of the first layer, with further electrically conductive material on the sides of the first layer.

BRIEF DESCRIPTION OF THE SEVERAL VIEWS OF THE DRAWING

Embodiments of the present invention will now be described by way of non-limitative example, with reference to the drawings, in which.

DETAILED DESCRIPTION OF THE INVENTION

Figure 1:
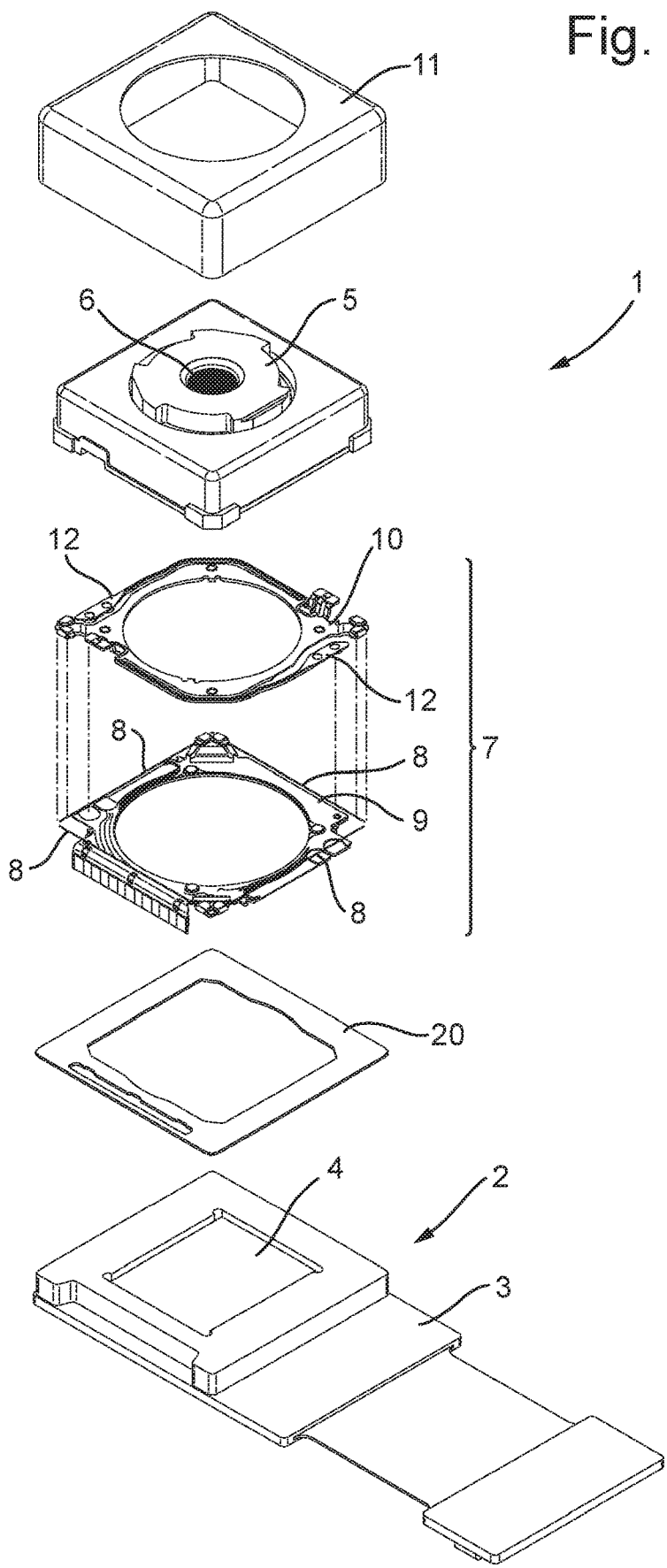
FIG. 1 shows an exploded perspective view of a camera.

A camera 1 is shown in FIG. 1 and arranged as follows.

The camera 1 comprises a sensor assembly 2, which comprises a flexible circuit board 3, and an image sensor 4 that is implemented in an integrated circuit chip and is optionally be covered by an infra-red filter (not shown).

The camera 1 also comprises a lens holder 5 holding a lens 6 that is arranged to form an image on the image sensor 4. A single lens 6 is shown in FIG. 1, but more than one lens 6 may be provided.

The camera 1 also comprises an SMA actuation assembly 7 comprising plural SMA wires 8 connected between a static layer 9 (lowermost in FIG. 1) and a movable layer 10 (uppermost in FIG. 1). In the example of FIG. 1, four SMA wires 8 are provided, but in general any number of SMA wires 8 may be used.

The movable layer 10 can move relative to the static layer 9. In the example shown in FIG. 1, the movable layer 10 can move relative to the static layer 9 laterally of the optical axis of the lens 6, but in general the relative movement may be with any degree of freedom, for example translational movement along any axis and/or rotational movement about any axis.

In the example shown in FIG. 1, the SMA actuation assembly 7 includes a suspension system, formed by flexures 12 connected between the static layer 9 and the movable layer 20, which supports the movable layer 10 on the static layer 9 in a manner allowing the desired movement of the movable layer 10 relative to the static layer 9. As an alternative, the suspension system could be formed in some other way, for example formed by ball bearings or a sliding bearing. As another alternative, the suspension system nay be omitted in which case the movable layer 10 is supported on the static layer 9 solely by the SMA wires 8.

The static layer 9 is mounted to the sensor assembly 2 (via the screening plate 20 described below) and the movable layer 10 is connected to the lens holder 5, so that the movement of the movable layer 10 relative the static layer 9 generates movement of the lens 6 relative to the image sensor 4. Similarly, the SMA wires 8 are arranged to drive movement of the movable layer 10 relative to the static layer 9, and therefore to drive movement of the lens 6 relative to the image sensor 4.

The SMA actuation assembly 7 may have various different constructions, involving various numbers of SMA wires 8 in various configurations, and various forms of suspension system, so that the SMA wires 8 drive movement of the lens 6 relative to the image sensor 4 with various different degrees of freedom to provide different optical functions, for example as follows.

In one type of construction, the SMA actuation assembly 7 drives movement of the lens 6 relative to the image sensor 4 to provide focussing of the image formed on the image sensor, i.e. movement along the optical axis of the lens 6. In this case, the SMA actuation assembly 7 may, for example, have a construction as disclosed in more detail in WO-2007/001050, WO-2008/099156 or WO-2009/056822.

In another type of construction, the SMA actuation assembly 7 drives movement of the lens 6 relative to the image sensor 4 to provide optical image stabilisation, i.e. movement laterally of the optical axis of the lens 6. In this case, the SMA actuation assembly 7 may, for example, have a construction as disclosed in more detail in WO-2013/175197, WO-2014/083318, or WO-2017/055788.

In another type of construction, the SMA actuation assembly 7 drives movement of the lens 6 relative to the image sensor 4 to provide focussing of the image formed on the image sensor and optical image stabilisation. In this case, the SMA actuation assembly 7 may, for example, have a construction as disclosed in more detail in WO-2011/104518 or WO-2012/066285.

Although the camera 1 shown in FIG. 1 uses the SMA wires 8 in the SMA actuation assembly 7 as an actuator, any other form of actuator could alternatively be employed, for example a voice coil motor.

The camera 1 also includes a can 11 which encases the other components of the camera 1, providing mechanical protection and reducing ingress of dirt.

Figure 2:
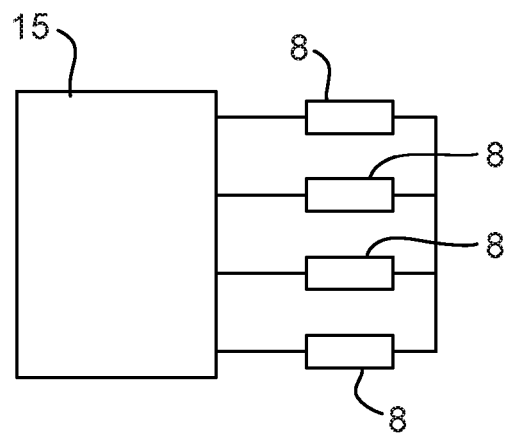
FIG. 2 is a diagram of a control circuit connected to SMA wires in the camera.

The camera 1 includes a control circuit 15 as shown in FIG. 2 in a non-limitative example including four SMA wires 8 connected together at the movable layer 10. The control circuit 15 may be implemented in an integrated circuit chip attached to the sensor assembly 2. The control circuit 15 is connected to the SMA wires 8 and supplies PWM drive signals thereto. The drive signals are conduct by conductive components of the SMA actuation assembly 7 including the SMA wires 8 themselves and other conductive components electrically connected to the SMA wires 8.

The drive signals provide resistive heating of the SMA wires 8 to selectively vary their temperature, and hence the degree of their contraction. Heating is provided directly by the drive signal. Cooling is provided by reducing the power of the drive signal to allow the SMA wires 8 to cool by conduction, convection and radiation to their surroundings.

In general terms, the control circuit 150 may be configured to generate drive signals as disclosed in any of WO-2007/113478, WO-2008/099156, WO-2008/129291, WO-2009/071898, or WO-2010/089529, except that the drive signals are PWM drive signals.

The use of a PWM drive signal improves the efficiency of the drive circuit. The PWM drive signals are pulsed signals that are switched on and off to modulate the power of the drive signal. They may be derived from any type of current source, for example a constant current source or a constant voltage source and may in general be any type of switched signal. The duty cycle describes the ratio between the time that the drive signal is switched on to the overall period of the signal. The duty cycle is altered to modulate the power of the drive signal. A common approach that may be applied here is for the PWM drive signal to have a constant period, in which case the duty cycle is varied by changing the time that the drive signal is switched on. However, other approaches may alternatively be applied, for example having a constant time that the drive signal is switched on, in which case the duty cycle is varied by changing the overall period of the signal. Typically the actuator is driven with square pulses at frequencies in the range of 30-100 kHz.

When the PWM drive signal is pulsed through the SMA wires 8 and other conductive components, this current causes an electro-magnetic field to be formed according to Ampere's law. The pulsed fields interfere with the image sensor 4 and the tracks connected thereto, causing noise which, in some cases, causes artefacts to form on the displayed image.

Figure 3:
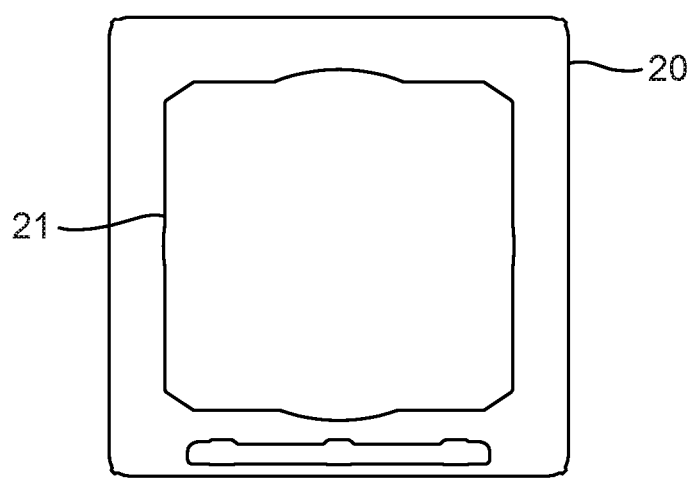
FIG. 3 is a plan view of a base plate of the camera which acts as a shielding component.

To reduce this problem, a base plate 20 is attached between the static layer 9 of the SMA actuation assembly 7 and the sensor assembly 2, as shown in FIG. 1. The base plate 20 is shown in isolation in FIG. 3 and has a central aperture 21 that has a rectangular shape to match the shape of the light sensitive area of the image sensor 4. The base plate 20 is therefore located between (a) the SMA wires 8 and the other conductive components that conduct the PWM drive signals, and (b) the image sensor 4 and the tracks connected thereto. The base plate 20 forms a screening component that screens the image sensor 4 from the PWM drive signals, thereby reducing the appearance of artefacts on the displayed image. The base plate 20 is therefore electrically isolated from the SMA actuation assembly 7, and in particular from the SMA wires 8 and the other conductive components that conduct the PWM drive signals. The base plate 20 is also electrically isolated from the image sensor 4.

The base plate 20 is not connected to an electrical earth. Advantageously, it has been found that leaving the base plate 20 floating provides as good a screen for the image sensor 4 as if the base plate 20 was earthed. Adequate earthing for high frequency noise is difficult whilst achieving a compact design.

The base plate 20 may take various forms, some non-limitative examples of which will now be described.

In a first example, the base plate 20 is made from electrically conductive material having a high conductivity, and may be a single layer of material. The electrically conductive material may have an electrical conductivity higher than 2 MS/m, preferably higher than 10 MS/m, even more preferably higher than 50 MS/m. For example, the electrically conductive material may be copper. When the SMA wires 8 are driven with PWM drive signal, the resulting dynamic electromagnetic field induces eddy currents in the electrically conductive material. The eddy current is formed to oppose the magnetic field and the sensor and connecting tracks are screened. Whilst the electrically conductive material is effective for higher frequencies, it is less effective for lower frequencies.

In a second example, the base plate 20 is made from a magnetically permeable material having a high relative magnetic permeability, and may be a single layer of material. The magnetically permeable material may have a relative magnetic permeability greater than 2, preferably greater than 100, most preferably greater than 500. For example, magnetically permeable material may be a magnetic grade of stainless steel, such as 420. The high relative magnetic permeability of the base plate 20 causes the magnetic field generated by the current flowing through the SMA wires 8 to be drawn inside the material of the base plate 20. This confines most of the magnetic field to lie within the material of the base plate 20, thus reducing the magnitude of the magnetic field that passes through the image sensor 4 and circuitry connected thereto, and so reduces noise that appears on the displayed image.

In order to further reduce the image noise for the whole frequency range, a method of screening is required, which both addresses slow changes in magnetic field and faster changes. This may be achieved by forming the base plate 20 from a single layer of material whose properties are appropriately selected, but the choice of material is restricted, because while some materials have one desirable property they may lack another. Properties that are typically of concern are the permeability, the electrical conductivity, the strength of the material (Young's modulus and yield stress), compatibility with the rest of the system (e.g. ability to be welded, corrosion resistance, thermal expansion coefficient) and cost.

In order to find a good compromise between these properties it may be desirable that the base plate 20 comprises plural conductive layers of different materials, typically metals, having different electro-magnetic properties. The layers may include one or more layers of electrically conductive material having a high conductivity and one or more layers of a magnetically permeable material having a high relative magnetic permeability. Some examples of this will now be described, wherein the electrically conductive material and the magnetically permeable material may have properties as described above with respect to the first and second examples.

Figure 4:
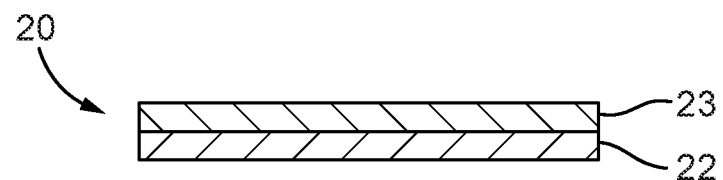
FIGS. 4 to 6 are cross-sectional views of examples of the base plate, with an exaggerated thickness for clarity.

In a third example shown in FIG. 4, the base plate 20 comprises a first layer 22 of magnetically permeable material and a second layer 23 of electrically conductive material placed on one side of the first layer 22. In this example, the second layer 23 is located between the SMA wires 8 and the first layer 22. Alternatively, the second layer 23 could located between the image sensor 4 and the first layer 22, although that is not preferred. In this example, an improved screening is obtained that reduces interference further.

Figure 5:
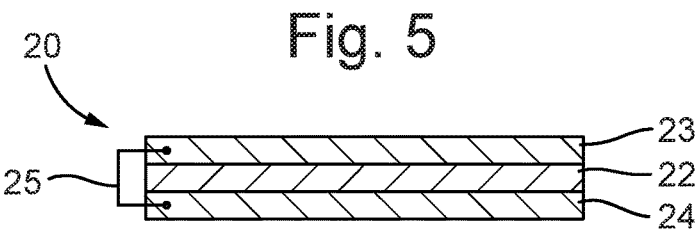

In a fourth example shown in FIG. 5, the base plate 20 comprises a first layer 22 of magnetically permeable material and a second layer 23 of electrically conductive material as in the third example, but additionally comprises a third layer 24 of electrically conductive material on the other side of the first layer 22. Surprisingly it has been found that placing layers 23 and 24 of electrically conductive material on both the actuator side and the sensor side of the first layer 22 of magnetically permeable material improves the screening still further.

Optionally, the second and third layers 23 and 24 are electrically connected by a connection 25. It has also been found that such an electrical connection between the layers 23 and 24 of electrically conductive material improves the screening still further.

Figure 6:
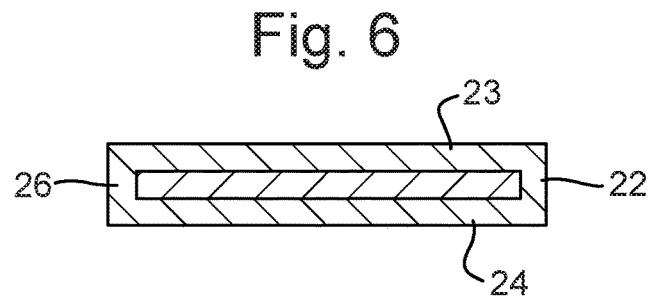

In a fifth example shown in FIG. 6, a first layer 22 of magnetically permeable material is encapsulated by electrically conductive material, which may be applied as a coating or plating, so that the electrically conductive material on either side of the first layer 22 forms second and third layers 23 and 24, similar to the fourth example, and the further electrically conductive material 26 on the sides of the first layer 22 makes an electrical connection therebetween. It has been found that this provides more effective screening than the fourth example.

In another variant, the base plate 20 may comprise larger numbers of alternate layers of electrically conductive material and magnetically permeable material.

In any example where the base plate 20 comprises plural conductive layers of different materials, the layers may be attached together by any method of coating or applying layers as known to those skilled in the art, such as sputtering, metal vapour deposition, rolling etc. Further masks may be applied to the material so as to expose spots for attaching the can 11, or for making other connections as required.

In another type of example, the base plate 20 comprises plural conductive layers of different materials, as described above, and further comprises insulating material between some or all of the metal layers. The insulating layers may comprise adhesive used to attach the layers so that the base plate is a lamination.

Figure 7:
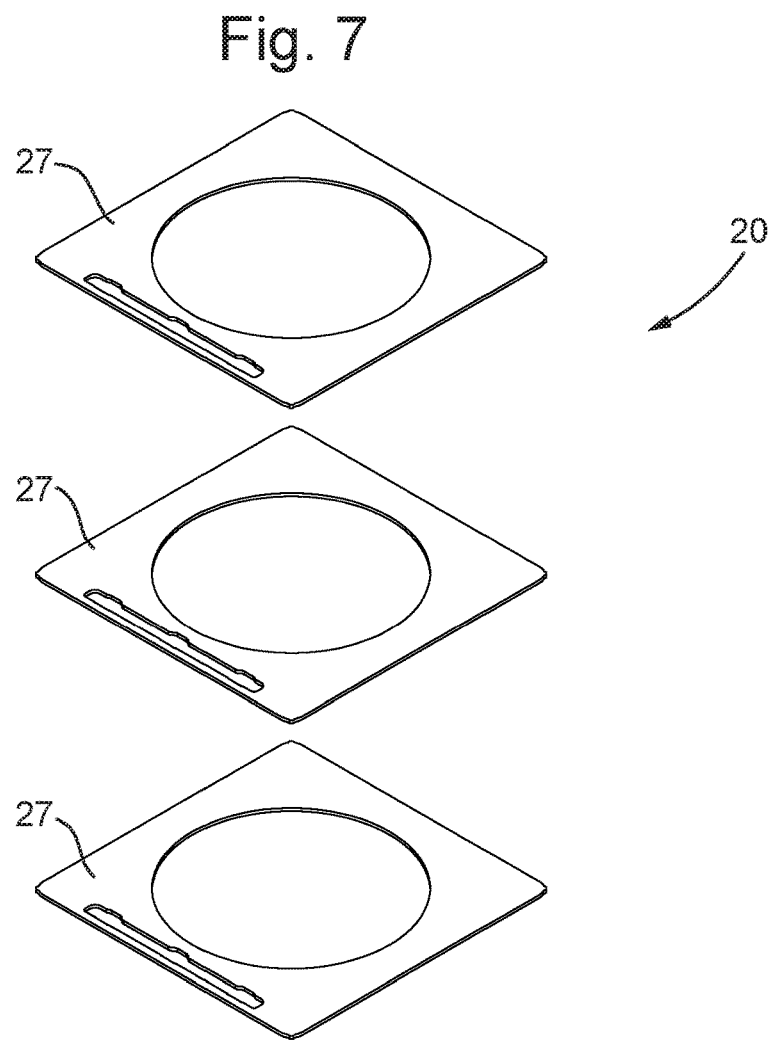
FIG. 7 shows an exploded view of an example of the base plate with a laminate structure.
Figure 8:
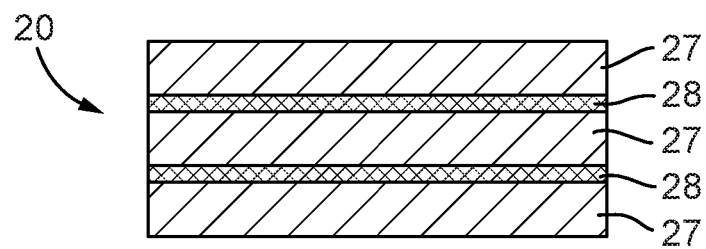
FIG. 8 is a cross-sectional view of the example of the base plate shown in FIG. 7.

FIGS. 7 and 8 show a fifth example of this type, wherein the base plate 20 comprises three component layers 27 attached together by layers 28 of adhesive material that is insulating. The component layers 26 may be single layers of material, for example similar to the fourth example above, in which case there is a layer 28 of adhesive material between each of the metal layers. Alternatively, the component layers 27 may themselves each comprise plural conductive layers of different materials. For example, the component layers 27 may each have the same construction as the base plate 20 in any of the third to fifth examples above.

In this type of example, eddy currents are formed separately in each component layer 27 thereby increasing the surface area and cancelling the magnetic field more effectively. It has been found that this combination provides better cancellation than a single component layer of that is thicker to fit within a very compact space.

Figure 9:
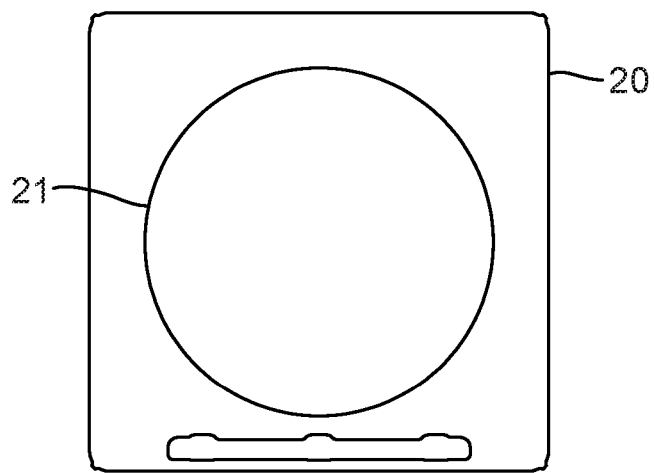
FIG. 9 is a plan view of the base plate in an alternative configuration.

In another type of example, the surface area of the base plate 20 may be increased by changing its configuration as shown in FIG. 9 by changing the shape of the central aperture 21 in the base plate 20 to have a circular shape while ensuring that it does not clip any light collected by the lens that otherwise would be detected by the image sensor 4. The increased surface area of the base plate 20 also increases the amount of eddy current that can form, further increasing the screening of the magnetic field emanating from the SMA wires 8.

The invention claimed is:

1. A camera comprising:
   an image sensor;
   an actuator which includes conductive components capable of conducting a pulse width modulation drive signal for driving the actuator, wherein the actuator comprises shape memory alloy material; and
   a screening component located between the conductive components of the actuator and the image sensor, the screening component being electrically isolated from the actuator and the screening component being configured to reduce interference from the pulse width modulation drive signal with the image sensor.

2. The camera according to claim 1, wherein the shape memory alloy material comprises shape memory alloy wire.

3. The camera according to claim 1, further comprising a lens arranged to form an image on the image sensor, the actuator being arranged to drive movement of the lens relative to the image sensor.

4. The camera according to claim 1, wherein the screening component is not connected to an electrical earth.

5. The camera according to claim 1, wherein the screening component contains magnetically permeable material having a relative magnetic permeability greater than 2.

6. The camera according to claim 5, wherein the magnetically permeable material has a relative magnetic permeability of greater than 100.

7. The camera according to claim 5, wherein the magnetically permeable material has a relative magnetic permeability of greater than 500.

8. The camera according to claim 1, wherein the screening component contains electrically conductive material having a conductivity greater than 2 MS/m.

9. The camera according to claim 8, wherein the electrically conductive material has a conductivity greater than 10 MS/m.

10. The camera according to claim 8, wherein the electrically conductive material has a conductivity greater than 50 MS/m.

11. The camera according to claim 1, wherein the screening component comprises plural layers having different electro-magnetic properties.

12. The camera according to claim 11, wherein the plural layers comprise plural metal layers having different electro-magnetic properties.

13. The camera according to claim 12, wherein the plural metal layers include a first layer comprising magnetically permeable material and a second layer comprising electrically conductive material.

14. The camera according to claim 13, wherein the second layer is located between the actuator and the first layer.

15. The camera according to claim 14, wherein the plural layers include a third layer comprising electrically conductive material located between the first layer and the image sensor.

16. The camera according to claim 15, wherein the second and third layers are electrically connected.

17. The camera according to claim 15, wherein the first layer is encapsulated by the second and third layers and by further electrically conductive material on the sides of the first layer.

18. The camera according to claim 13, wherein the plural metal layers include plural layers comprising electrically conductive material alternating with plural layers comprising magnetically permeable material.

19. The camera according to claim 13, wherein the plural layers further comprise at least one layer of insulating material between the metal layers, wherein the insulating material comprises an adhesive.

20. The camera according to claim 1, further comprising a control circuit arranged to supply the pulse width modulation drive signal to the conductive components of the actuator.

* * * * *